Sept. 13, 1938.  G. EVERHART  2,129,998
AUTOMATIC CABLE RELEASE LOCK FOR CAMERAS
Filed Aug. 26, 1936   2 Sheets-Sheet 2

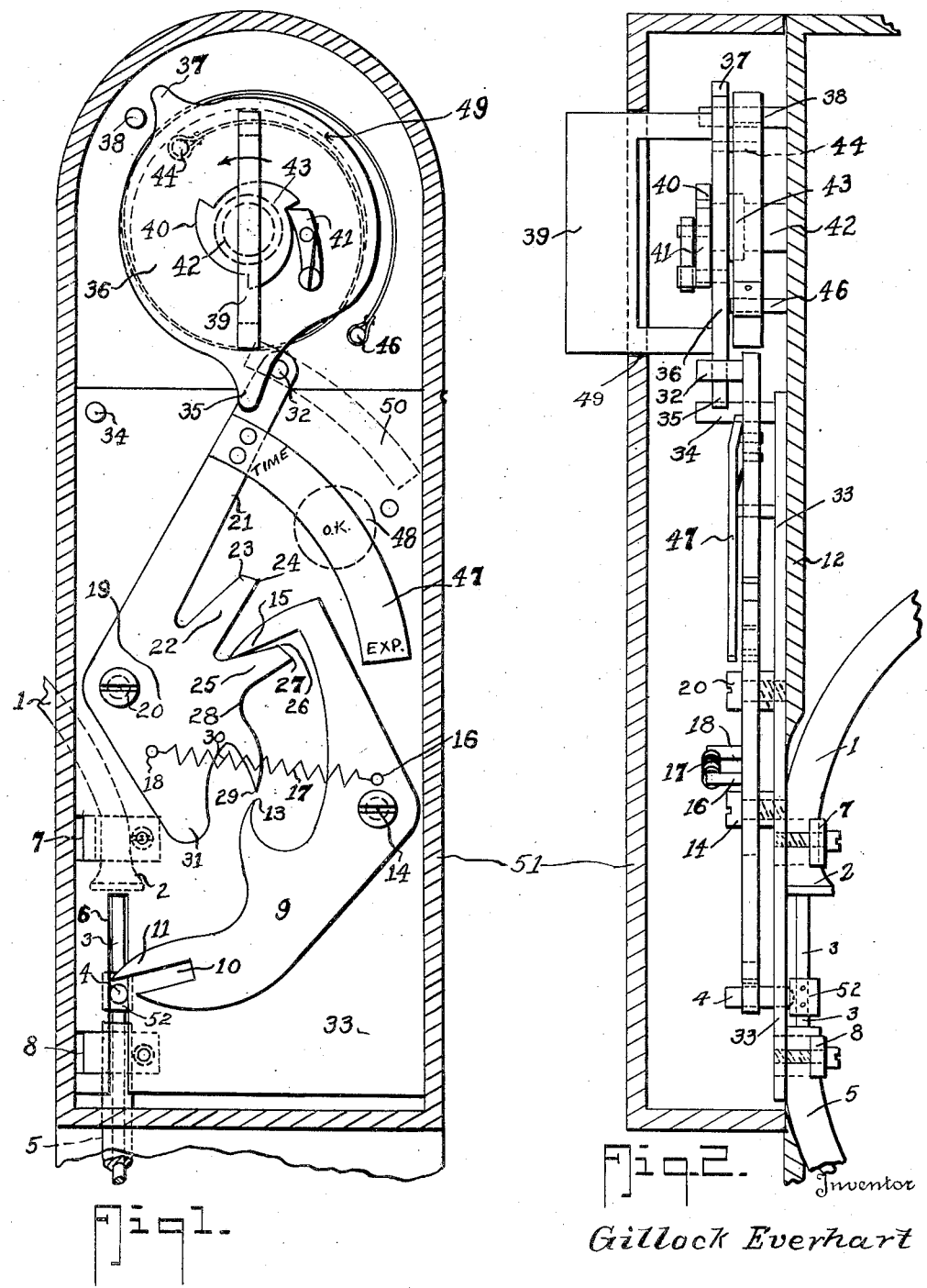

Inventor
Gillock Everhart
By Albert E. Dieterich
Attorney

Patented Sept. 13, 1938

2,129,998

UNITED STATES PATENT OFFICE 2,129,998

AUTOMATIC CABLE-RELEASE LOCK FOR CAMERAS

Gillock Everhart, Lawrence, Kans., assignor of one-third to George W. Everhart, Lawrence, Kans., and one-third to E. B. Everhart, Kansas City, Mo.

Application August 26, 1936, Serial No. 98,059

11 Claims. (Cl. 95—31)

The invention is an attachment for a photographic camera using a roll film.

Primarily it has for its purpose to provide protection against accidental double exposure of the negative and the resulting loss of one negative and two desired pictures.

A further object is to accomplish the aforesaid purpose by automatically locking the shutter-operating device upon the completion of one operation of the shutter, so that a second operation of the shutter is impossible until the device is unlocked.

A still further object is to bring about the unlocking of the device automatically when the film roll is turned to the proper position for the next exposure.

The locking and unlocking arrangements alone provide protection against double exposures. However, if the device is enclosed in the camera casing as seems desirable, the camera user, if he is in doubt whether or not the shutter can be operated, would ordinarily be unable to determine the same except by actually attempting to operate it. This would be inconvenient. Sometimes the opportunity to get a desired picture is momentary, and an unsuccessful attempt to operate the shutter might result in the loss of the opportunity to take that picture. To minimize the probability of such a failure is another object of the invention, which is accomplished by providing the device with an indicator which shows, at all times, the condition of the shutter lock and of the negative then in position for exposure.

A further object is to provide a device of the character stated in which the signal comes to rest against a permanent stop as soon as the exposure is completed, and remains there, indicating "exposed" until it is automatically returned, by the operation of moving the film, to its next proper position to indicate "ready".

A still further object of the invention is to provide a device of the character stated which does not change the usual or normal way to operate the shutter and turn the film, i. e., the shutter is operated in the usual way (with a cable release) and the film is moved by turning the winding-up bobbin by a manually operated key—this being a distinct advantage where the scene changes rapidly, as for example at sports events.

Again it is an object of the invention to provide a means to prevent double exposures, whose action is definitely mechanically dependent on both the shutter-release mechanism and the film winding-up key.

Other objects will in part be obvious and in part be pointed out hereinafter.

To the attainment of the aforesaid objects and ends the invention still further resides in the novel details of construction, combination and arrangement of parts, all of which will be first fully described in the following detailed description and then be particularly pointed out in the appended claims, reference being had to the accompanying drawings, in which:—

Figure 1 is a side elevational view of a portion of a camera, the case being in section to show the invention in elevation in the normal position.

Figure 2 is a side view thereof (the case being in section) looking from right to left in Figure 1.

Figures 3, 4:
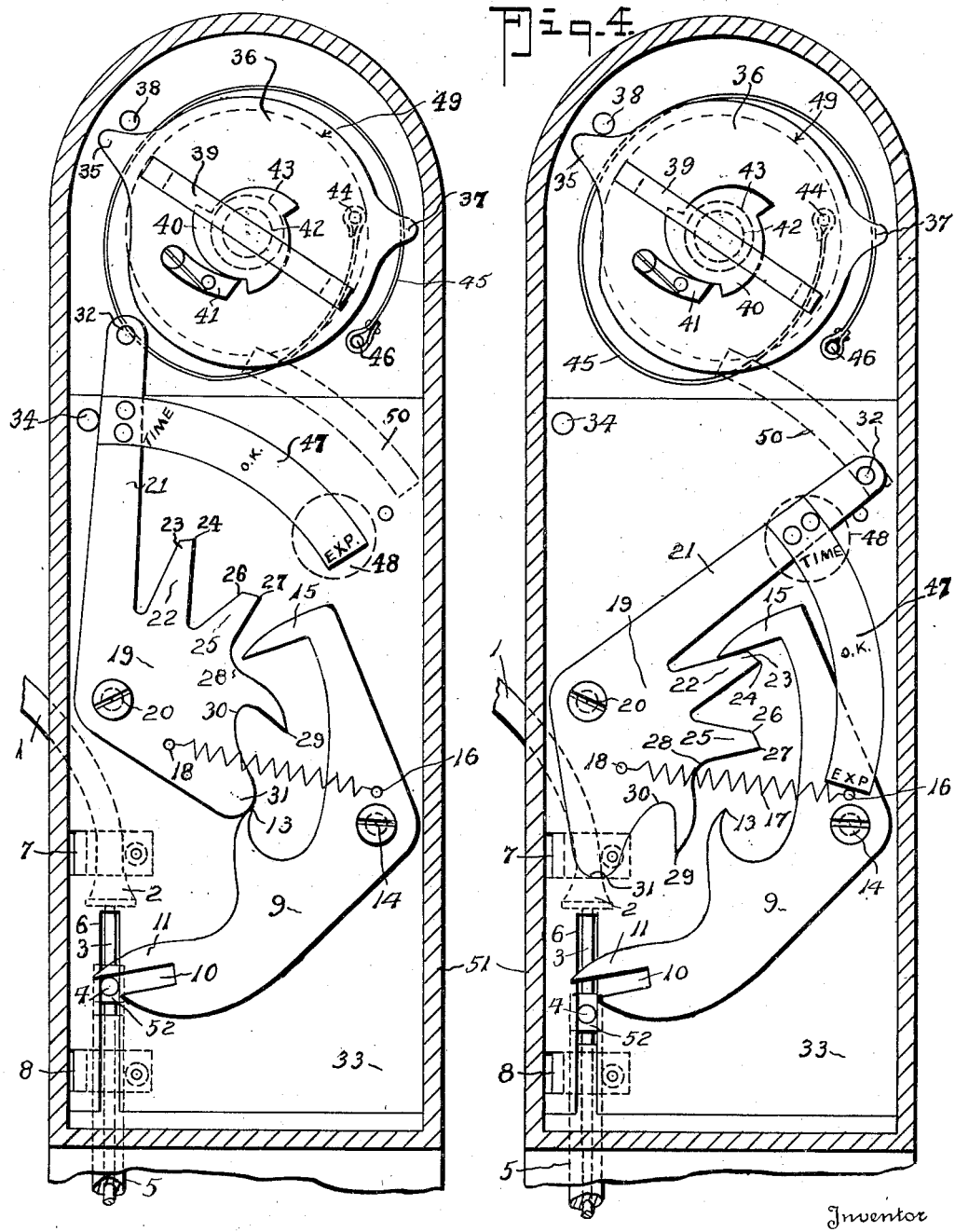
Figure 3 is a view similar to Figure 1, showing the "exposed" position of the parts.
Figure 4 is a view similar to Figure 1, showing the parts set for a "time" exposure (the abnormal position).

The invention is intended to be mounted on the side of the camera frame, either as an attachment or a built-in feature, near the winding device.

In the drawings, in which like numbers and letters of reference indicate like parts in all of the figures, 1 represents the housing of the cable-release that leads to the shutter (not shown) of the camera. The flange, which usually is held against the first and second fingers of the hand when the cable-release is used in the ordinary way, is indicated by 2. The button on rod 3, which is ordinarily pushed by the thumb to operate the cable-release, is replaced by a coupling 52 that is provided with a pillar 4 that extends through a guide slot 6 in the base plate 33, so that it may engage the arm 11 of a lever 9. The lever 9 is fulcrumed on a stud 14 carried by the plate 33.

The coupling 52 connects with the front end of a second cable 5, which is operated by hand in the usual way. The housings, 1 and 5, of the cables are secured to the plate 33 by suitable clamps 7 and 8, respectively.

The arm 11 of the lever 9 is slotted at 10 to receive the pillar 4, the lower furcation of the arm 11 being shorter than the upper one at slot 10 so as to clear the pillar 4, when the parts are positioned as shown in Figure 1.

The side wall or frame of the camera to which the plate 33 is attached in any suitable way is designated by 12 and the cover for the attachment is indicated by 51. The lever 9 constitutes one element of a locked escapement device, the other element of which is constituted by a second lever 19 pivoted on a stud 20 carried by the plate 33. The lever 9 has a pair of pallets or fingers 13 and 15 to cooperate with the fingers 29 and 22, 25, respectively.

The levers 9 and 19 have lugs 16 and 18 connected by a coil spring 17 so that, when the levers are unrestrained, they will be moved by the spring until they assume the position shown in Figure 3, with the long arm 21 of the lever 19 resting against the fixed stop pin 34 carried by the plate 33.

23, 24, 26, 27, 28 and 31 designate points along the margin of the lever 19, to which reference will be made later.

The arm 21 carries a pin or roller 32.

Mounted loosely on the winding shaft 42 of the usual film-winding device, is a disc 36 having a stop finger 35, the latter being designed to engage the pin-roller 32 for moving lever 19 from the position of Figure 3 to the position of Figure 1. A spring 45 anchored to a fixed spring attaching lug 46 on the camera frame, and connected to a spring attaching lug 44 on the plate 36, serves to return plate 36 to a position where its finger 35 will engage the stop pin 38, also fixed to the camera wall. A three-tooth ratchet 40 is secured to the shaft 42 and the disc 36 is located between the ratchet 40 and a collar 43, also secured to the shaft 42 (see Figure 2). The disc 36 carries a spring pressed pawl 41 to engage the ratchet 40 and the disc may be turned by means of the key 39 fixed to it. The finger 37 is provided to prevent the disk from being turned so far as to move the finger 32 to a position where the finger 35 would slip past the pin-roller 32 as this would prevent the finger from returning to its normal position against the stop 38.

The lever arm 21 preferably carries a signal segment 47 having thereon the indicia "time", "O. K." and "exp.", or other similar indicia suitable for the purpose, and the cover 51 is provided with a window 48 to expose a portion of the signal at a time. The cover also has a slot 50 through which one may insert his finger to engage pin-roller 32 to move the lever to the "time" position. The cover 51 also has an opening 49 in which the key 39 turns.

Operation

The parts are shown in Figures 1 and 2 in the ready position, i. e., the position of the parts when the negative is unexposed and the shutter can be operated. When an exposure is to be made the cable-release 5 is operated in the usual way, and this operates the cable-release 1 and the camera shutter (not shown), thus exposing the film negative (not shown). Since pillar 4 bears against the arm 11 of lever 9 the movement of the pillar upwardly (Figure 1) will move the lever 9 clockwise about its pivot 14. As the end of finger 15 reaches the point 26, of lever 19, the shutter has not yet been, but is about to be, operated. As the end of finger 15 passes point 26, the torque on lever 19 about pivot 20 forces lever 9 still farther clockwise, thus relieving back pressure of finger 11 against pillar 4 and the shutter opens when the end of finger 15 is somewhere along the path between points 26 and 27. Meanwhile finger 13 of lever 9 has entered the recess 30 in lever 19. As the finger 15 passes point 27 of finger 25, lever 19 turns freely under the torque of the spring 17 until stopped when some point 31 on the heel of the lever 19 comes into contact with the finger 13.

Then, as the cable-release is permitted to return, the finger 13 recedes out of recess 30, thus permitting lever 19 gradually to turn until it reaches its final position against stop 34 (see Figure 3). The cable-release system is now locked, and a second attempt to operate it would be unsuccessful. The movement of finger 13 is stopped at or near the point 31 and arm 11 therefore prevents pillar 4 and associate cables from advancing sufficiently to operate the shutter.

Unlocking the device

When the cable-release system is again to be operated, the device must first be unlocked. This is brought about automatically by having a part of the film winding device push a part of the lock into the unlocked position. As the film roll is turned by key 39 acting through disc 36, pawl 41 and ratchet 30, finger 35 makes contact with pin-roller 32 on lever 19 and moves it over from the position shown in Figure 3 to that shown in Figure 1. Lever 19 bearing against finger 15 on lever 9, forces lever 9 to turn clockwise, finger 15 moving along path 27—28. As 15 passes 27 it drops back into the recess between fingers 22 and 25.

If the plate 36 were rigidly mounted on the film-winding shaft 42, the finger 35 might interfere with the operation of the lock. When the film comes to its proper position for exposure the finger 35 might happen to come to rest somewhere in the patch followed by pin-roller 32 during the operation of the shutter. To make this impossible the film-winding device is designed to cause resetting finger 35 always to come to rest against stop 38 under the torque of the spring 45. Thus, as soon as the winding of the film has been completed, finger 35 recedes out of the path of roller 32.

Because of the stop 38, disc 36 cannot be turned continuously in one direction, but must be turned forward and backward. The ratchet 40 and pawl 41 are provided to convert this motion into the necessary uni-directional movement for advancing the film roll. In order to insure the unlocking of the cable-release lock, pin-roller 32 must be moved through a certain minimum angle. Conceivably one might turn the film in such short steps as not quite to do this. To make this impossible the ratchet is provided with only three equally spaced teeth, and the fingers 37 and 35 are so placed as to permit disc 36 to turn through an angle somewhat greater than 120°. Thus, disc 36 must be moved through a total of not less than 120° in order for pawl 41 to engage the succeeding ratchet tooth, which is necessary before the film can be advanced farther. The parts are so proportioned that this will move pin-roller 32 far enough to unlock the device.

Bulb exposures

For bulb exposures the cable-release is operated in the manner usual for such exposures.

Time exposures

Normally the shutter actuating device is operated twice during a time exposure—once to open the shutter and again to close it after the proper time has elapsed. Such double action is exactly what this invention is intended to forestall. In order to permit time exposures the lever 19 is provided with a second arm 22 similar to the arm 25, and the opening 50 in the casing or cover 51 is provided to permit 32 to be moved by hand in a further clockwise direction to the position shown in Figure 4, where finger 15 drops into the recess between arm 21 and finger 22. The finger 13 on lever 9 enters the recess near 28; the first operation of the cable-release brings finger 15 into the position shown in Figure 1, and the second operation then proceeds as previously described. It should be noted that to make this double operation of the shutter possible the user must perform a conscious act, and an unintentional double exposure remains practically impossible.

From the foregoing description, taken in connection with the accompanying drawings, it is thought the construction, operation, and advantages of the invention will be clear to those skilled in the art.

While I have shown and described the preferred embodiment of the invention, it is obvious that changes in the details of construction, combination and arrangement of parts may be made without departing from the spirit of the invention and scope of the appended claims.

What I claim is:—

1. In a camera having a shutter cable-release and a manually operated roll film wind-up device, said device including a rotatable key-carrying member, a film roll winding shaft, and a pawl and ratchet connection between said key-carrying member and said shaft; the combination with said key-carrying member of means to lock said cable release against action after the cable-release shall have been actuated to effect a complete operation of opening and subsequently closing the shutter regardless of whether the shutter be adjusted for instantaneous, bulb or time exposures.

2. In a camera having a cable-release for the shutter and a manually actuated film winding mechanism including a rotatable key-carrying member, a film roll winding shaft and a pawl and ratchet connection between said key-carrying member and said shaft; a cable-release lock, actuated by the movement of the cable in effecting a complete shutter action, to prevent double exposure, and means actuated by the turning of said key-carrying member to reset said lock to the normal position thereof, and means continuously tending to restore said key-carrying member to a definite normal position.

3. In a camera, a film winding shaft, an oscillatable key for turning said shaft, a ratchet and pawl connection between said key and said shaft, a fixed stop, means continuously tending to turn said key in a direction to have its movement arrested by said stop, a cable-release for the shutter of the camera, and a cable-release lock cooperative with the cable-release to lock it after each complete action of the shutter, and means actuated by said key in winding the film, for restoring said cable-release lock to its normal position.

4. In a camera having a cable-release for the shutter and a manually actuated film winding mechanism, a cable-release lock, actuated by the movement of the cable in effecting a complete shutter action, to prevent double exposure, means actuated by the turning of the film winding mechanism to reset said lock to the normal position thereof, and means by which said lock may be set to its abnormal position by hand.

5. In a camera, a film winding shaft, an oscillatable key for turning said shaft, a ratchet and pawl connection between said key and said shaft, a fixed stop, means continuously tending to turn said key in a direction to have its movement arrested by said stop, a cable-release for the shutter of the camera, and a cable-release lock cooperative with the cable-release to lock it after each complete action of the shutter, means actuated by said key in winding the film, for restoring said cable-release lock to its normal position, and means by which said lock may be set to its abnormal position by hand.

6. In apparatus of the character described, the combination with a cable-release for the shutter of a camera, of a cable-release locking mechanism, comprising two levers, means continuously tending to turn said levers in a counter-clockwise direction, means actuated by the cable-release for turning one of said levers in a clockwise direction, said levers having a connection of the escapement type between them, and having provision to lock the levers once they shall have been actuated and thereby lock the cable-release.

7. In apparatus of the character described, the combination with a cable-release for the shutter of a camera, of a cable-release locking mechanism, comprising two levers, means continuously tending to turn said levers in a counter-clockwise direction, means actuated by the cable-release for turning one of said levers in a clockwise direction, said levers having a connection of the escapement type between them, and having provision to lock the levers once they shall have been actuated and thereby lock the cable-release, a film winding-up shaft and winding key, and means governed by the act of winding the film for restoring said levers to their normal positions.

8. In combination with the shutter release cable and the manually operated film winding device of a camera which device includes a film roll winding shaft, a rotatable key-carrying member, a pawl and ratchet device connecting said member with said film roll winding shaft, and means continuously tending to restore said key-carrying member to a definite normal position, a cable-release lock, means holding said lock in a normal position, means governed by said cable for actuating said lock to lock the cable against "double exposure" action thereof, and means governed by the key-carrying member of said film winding device and independently of the film itself in turning up an exposed section of film for restoring said lock to its normal position.

9. In a camera of the roll-film type having a film-winding shaft and a cable-release for the shutter; an oscillatable loose disc on said winding shaft, a ratchet fast on said shaft, a pawl on said disc to engage said ratchet, a winding key on said disc for turning the same, a fixed stop limiting the turning movement of said disc; a cable-release, a lock device actuatable by the operation of said cable-release in operating the shutter to lock said cable-release against further action until the exposed section of film has been wound up, said lock device including a pair of levers having an escapement connection, one lever being actuated by the cable-release and the other by its connection with the first lever, and means carried by said disc to engage said other lever of said lock device as the exposed section of film is being wound up, to reset said lock device.

10. In a camera of the roll-film type having a film-winding shaft and a cable-release for the shutter; an oscillatable loose disc on said winding shaft, a ratchet fast on said shaft, a pawl on said disc to engage said ratchet, a winding key on said disc for turning the same, a fixed stop limiting the turning movement of said disc; a cable-release, a lock device actuatable by the operation of said cable-release in operating the shutter to lock said cable-release against further action until the exposed section of film has been wound up, and means carried by said disc to engage said lock device as the exposed section of film is being wound up, to reset said lock device.

11. In a cable-release lock, a plate, two levers pivotally mounted on said plate, a spring connection between said levers continuously tending to move them counter-clockwise, a fixed stop on said plate against which one of said levers may rest, an escapement-like connection between said levers which includes means to hold said levers in a normal position, means carried by the cable-release for connecting to one of said levers to effect a movement thereof from a normal position to a position where the levers will be locked against movement in any direction and thus lock the cable-release, and in combination with a film-turning mechanism including a member for moving said levers to reset them in normal position and thereby unlock the cable-release.

GILLOCK EVERHART.